Allen & Noyes,

Piston-Rod Packing.

No. 254. Reissued Jan. 10, 1854.

UNITED STATES PATENT OFFICE.

THOMAS W. ALLEN AND CHARLES W. NOYES, OF GREENBUSH, NEW YORK.

IMPROVEMENT IN STUFFING-BOXES.

Specification forming part of Letters Patent No. 5,357, dated November 6, 1847; Reissue No. 254, dated January 10, 1854.

*To all whom it may concern:*

Be it known that we, THOMAS W. ALLEN and CHARLES W. NOYES, of Greenbush, Rensselaer county, New York, have invented certain new and useful Improvements in Metallic Packing for Stuffing-Boxes, of which the following is a full, clear, and exact description, reference being had to the accompanying drawings, making part of this specification, in which—

Figure 1:
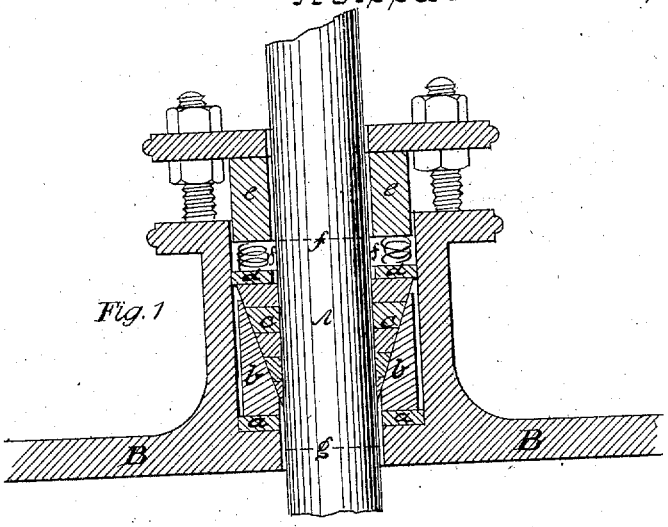
Figure 3:
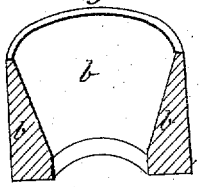
Figure 2:
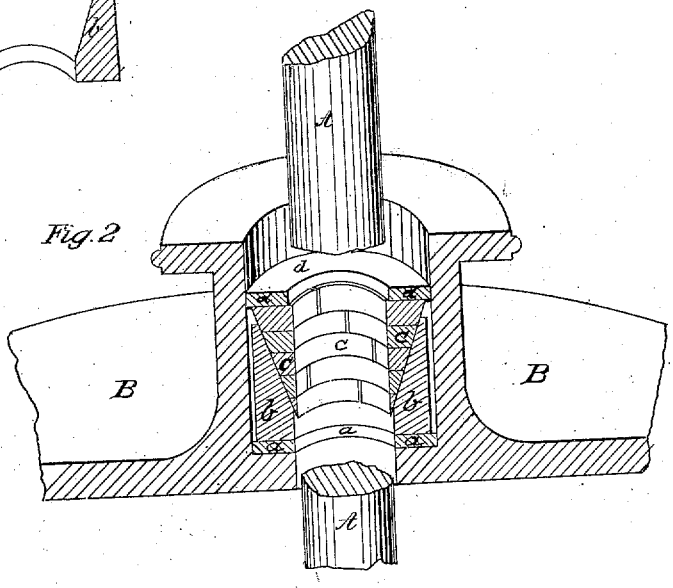

Figure 1 is a vertical section of a stuffing-box on a piston-rod; Fig. 2, a section of the same in perspective, with the piston-rod broken to exhibit the packing; and Fig. 3, a section of the packing-cup.

The same letters indicate like parts in all the figures.

The object of our invention is the production of a stuffing or packing box for piston-rods, shafts, &c., which shall be free to yield laterally to the vibrations or inequalities of motions of the piston-rod, shafts, &c., without producing leakage in the joints; and to this end the nature of our invention consists in fitting a metallic cup or ring, through which the piston-rod or shaft passes and plays, to the inside of the box, so that the bore of the said cup or ring may make a close joint, by packing or otherwise, with the surface of the piston-rod or shaft, and the end thereof, by end pressure, with the bottom of the box, to prevent the passage of steam or other fluid, while at the same time the said cup or ring may slide laterally in the box, to adapt itself to the vibrations or irregular motions of the piston-rod, shaft, or other rod thus packed; and our invention also consists in making the inner bore of the said cup conical, in combination with a series of cut metallic rings, whose outer peripheries are fitted thereto, so that by forcing the said rings endwise into the conical cup they shall be contracted to make a close joint with the surface of the piston or other rod or shaft passing through them, while at the same time the said end pressure shall force the end of the cup into close contact with the bottom of the box, and thus effectually make the joints tight without preventing the lateral play of the cup in the box to follow the vibrations of the piston-rod or shaft.

The diagram annexed hereto as part of this specification represents, on a scale of half its size, the stuffing-box of a locomotive-engine cylinder, in which this invention has been proved, and exhibits the method of construction. The stuffing-box of a cylinder made in the ordinary way is bored out truly, and the annular portion of its bottom, between the sides of the box and the orifice through which the piston plays, is turned or ground down smoothly and truly at right angles to the axis of the piston-rod. Upon this annular bottom we place a brass or composition ring in the diagram marked *a a*, of, say, a quarter-inch thick, fitting snugly within the box, but having a play of, say, one-eighth of an inch around the piston-rod. This ring is ground or fitted truly to the annular bottom of the box, and has its upper surface made truly parallel with its lower one. On this ring we next place a brass or composition cup, which we call the "vibrating cup." It is externally a cylinder, one-eighth of an inch less in diameter than the stuffing-box's bore, and, say, two and a half inches long. Internally it is so shaped as to receive, in addition to the piston-rod, as its matrix or bed, the metallic packing hereinafter described, conforming and fitting to it truly, as shown at *b b*. Its lower surface is also truly fitted to the ring *a a*.

The packing, which may be made of brass or composition metal or Babbitt metal, which last we use and prefer, consists of several rings (we have used five of half an inch thick each) ground truly to each other, fitting accurately with their internal edges the piston-rod, and having, when laid one on the other in their place in the cup just described, externally the shape of a frustum of an inverted cone whose upper or greater diameter is one-eighth of an inch less than that of the bore of the stuffing-box, and its lower and lesser diameter equal to the thickness of the piston-rod, as represented by *c c c c c*. These rings are cut or divided in one or more places, as convenience and experience may direct, taking out sufficient metal at the cuttings to allow a contraction of the circle of the rings as the wear of their internal surface against the piston-rod causes their parts to approach the centers of their circles. On the top of these conical rings we place another brass or composition metal ring, marked *d d*, similar to the lower one, *a a*, in all respects, and accurately ground or fitted to the topmost packing-ring. Upon the top of this ring, or else attached to the bottom of the cap or cover of the stuffing-box, are to be placed one or more springs, of a spiral, elliptical, or any other form convenient for the purpose of keeping a suitable pressure upon said ring, the effect of which will be to depress the packing into the conical-shaped chamber of the vibrating cup, and thereby thrust the packing inward, so as to embrace snugly the piston-rod, and effectually prevent the escape of steam or ingress of air along the rod, while the accuracy of the fitting of the outside of the packing to the cup and of the rings to each other and to the bottom of the stuffing-box will prevent escape of steam or entrance of air in any other direction.

The cap of the stuffing-box is formed in the usual way, leaving a sufficient space between its lower surface and the upper ring for the introduction of the springs.

For the purpose of conveniently regulating the pressure of the springs upon the packing, we use, in addition to the nuts employed to screw down the said cap, a set of nuts underneath the cap, so as to hold it exactly in any desired situation and give a fixed pressure upon the packing.

The object and intention of the vibrating cup is to afford that lateral motion to the piston-rod in the stuffing-box which necessarily arises in the best made machines from wear of parts, loosening of joints, and other derangements, especially in machines which, like locomotives, are driven with great velocity over irregular surfaces, and made to undergo great straining of parts, and which lateral motion if imparted to the conical packing lying in an unyielding matrix or bed would force it up obliquely to the line of the axis of the piston, and soon wear into irregularities the surfaces of impact of the rings on each other, and also on the piston.

We do not limit the proportions of the parts to those stated above, but vary them, so as to suit the case of different engines and different service; nor do we fix the angle made by the outer surface of the packing-rings and the axis of the piston at the degree of inclination described in this specification, (by way of illustration,) but vary it as may be found in practice best suited to effect the proper degree of pressure against the piston-rod by the packing.

We do not think it necessary to describe the various methods that may be used to keep the packing and the rings from revolving when the stuffing-box is used with rotating shafts, as any intelligent mechanic can adapt a variety of simple fixtures to effect that end.

It will be obvious from the foregoing that the first part of our invention may be employed without the second by fitting or packing the cup onto the piston-rod or shaft so as to make a close joint therewith by means other than the conical rings, and still retain the advantages due to the lateral play of the cup in the box.

What we claim as our invention, and desire to secure by Letters Patent, consists in—

1. Combining with a stationary stuffing or packing box a cup or ring or its equivalent, through which the piston-rod or shaft passes and works, so fitted, substantially as described, that the end thereof shall make a close joint by means of end pressure at the bottom of the stuffing or packing box, and be free to slide thereon laterally to follow the vibrations of the piston rod or shaft, as set forth.

2. Making the inner bore of the cup conical, in combination with the cut metallic rings fitted thereto substantially as described, so that by the application of end pressure the cut rings shall be forced into close contact with the periphery of the piston rod or shaft, and the end of the cup into close contact with the bottom of the box, as described, and thus effectually prevent the escape of steam or other fluid, and at the same time permit the required lateral play, as set forth.

THOS. W. ALLEN.
CHAS. W. NOYES.

Witnesses:
L. G. BANCROFT,
S. O. SHEPARD.